United States Patent Office 3,356,474
Patented Dec. 5, 1967

3,356,474
METHOD OF PROTECTING THE SURFACE OF THE MOLTEN BATH IN A GLASS SHEET FLOAT OPERATION
David Gordon Loukes, Eccleston Park, Prescot, and Albert Sidney Robinson, Birkdale, Southport, England, assignors to Pilkington Brothers Limited, Liverpool, England, a corporation of Great Britain
No Drawing. Filed Sept. 18, 1963, Ser. No. 309,878
Claims priority, application Great Britain Sept. 20, 1962, 35,901/62
5 Claims. (Cl. 65—26)

This invention relates to the manufacture of flat glass.

In the manufacture of flat glass in ribbon form on a bath of molten metal for example tin, or a tin alloy having a specific gravity greater than glass, the bath being so constituted as to have all the characteristics as fully described in U.S. Patent No. 2,911,759 the bath surface which is exposed at each edge of the ribbon may be subjected to oxygen and/or sulphur contamination from oxygen and sulphur which for various reasons find their way into the headspace over the ribbon.

The oxygen and sulphur can react with tin at the surface of the bath to form compounds of tin which may form contaminants for the glass. Similarly volatile compounds of tin may be present in the headspace over the bath.

To prevent the formation of contaminants it has been proposed to maintain in the headspace a plenum of a protective gas to prevent the ingress of extraneous gases which might contact the molten metal at the exposed surfaces at each edge of the ribbon and at the wedge-shaped cavity between the ribbon and the bath where it enters or leaves the bath. Where a rolled ribbon of glass is fed to the bath and is later taken from the bath with a surface brightness at least equal to that obtained by "fire finish" treatment of glass, the ribbon entering and leaving the bath moves on a path at a slight angle to the bath surface so that the surface of the bath so exposed must also be protected by the plenum of protective gas.

A main object of the present invention is to simplify and improve the surface protection of the molten metal bath.

A method of manufacturing flat glass during which the glass in ribbon form is supported on a bath of molten metal according to the present invention, is characterised by covering the whole of the exposed surface of the bath at least in the region of the outlet end of the bath. Oxygen and/or sulphur contamination of the tin by ingress of the ambient atmosphere is thereby eliminated at least in the outlet region of the bath.

From another aspect a method of manufacturing flat glass during which the glass in ribbon form is supported on a bath of molten metal over which a plenum of protective atmosphere is maintained, is characterised in that the molten metal is additionally protected against contamination by covering the exposed surface of the bath at least in the region of the outlet end of the bath.

In carrying out the present invention the bath is covered to a sufficient depth either with sodium chloride, or a mixture of sodium chloride and potassium chloride. Neither of these substances reacts with the tin to form contaminants for the glass.

The sodium chloride may predominate in the mixture but the eutectic mixture is obtained with an equimolecular mixture, and therefore an eutectic mixture of sodium chloride and potassium chloride is preferred as an alternative to sodium chloride.

The compound or mixture of compounds may be poured on to the bath in granular or molten form through one or more hatch chambers into the headspace within which chamber a plenum of a non-oxidising gas is preferably maintained against the ingress of ambient atmosphere into the chamber, during the operation of discharging into the headspace.

Sodium chloride (NaCl) and the aforesaid eutectic mixture (NaCl:KCl) do not significantly dissolve either oxygen or sulphurous gases so that when at least the discharge end of the bath is coated with either sodium chloride or the mixture of sodium chloride and potassium chloride these contaminants, if they exist in the atmosphere over that region of the bath, are effectively isolated from the bath.

The sodium chloride has a melting point of 801° C. but the eutectic mixture has a considerably lower melting point. Generally speaking glass in ribbon form leaving a bath of molten metal is taken from the bath in a path slightly inclined to the bath surface over a zone where the bath is at about 600° C.

Since the melting point of sodium chloride is 801° C. a coating of this compound is in a solid state at the discharge end of the bath. Accordingly the amount of sodium chloride supplied must be such as to ensure a solid layer of sufficient thickness at the discharge end of the bath both over the exposed surface of the bath at each side of the ribbon and underneath the ribbon moving over the aforesaid wedge shaped cavity to efficiently cover the bath in accordance with the invention.

Similarly a sodium chloride-potassium chloride eutectic mixture has a melting point somewhat higher than the temperature of the zone in the bath where the glass begins to leave the bath surface on its way to the outlet from the bath. This eutectic mixture is thus in a solid state in the region of the discharge end of the bath and therefore must be supplied in quantity sufficient to produce an efficient protective layer at the discharge end of the bath, though as the coating over the bath is in a molten state over a longer distance than the sodium chloride coating a lesser total quantity of the eutectic mixture is required as compared with the necessary quantity when sodium chloride alone is used.

In either case any chloride coating adhering to the glass can be readily removed from the glass by washing with water, e.g. by washing with hot water after the glass has left the annealing lehr to which it is directed after leaving the bath.

Against the possibility of the solid layer becoming permeable to gases in the headspace due to thinning the layer by adherence of the layer substance to the glass as it leaves the bath, it is preferred to maintain a protective gas over the bath at a slight plenum even though there is very little sticking of the coating to the glass.

In operating a process of manufacturing flat glass in ribbon form on a bath of molten tin, common salt has been employed in forming the protective coating on the bath and an equimolecular mixture of sodium chloride and potassium chloride (NaCl:KCl) having a melting point of 664° C. has been successfully used as a coating for the bath of a depth of at least 4 mm. in the solid state at the discharge end of the bath in achieving the isolation of the bath from the headspace in accordance with the invention and no discoloration of the glass occurs in either circumstance. An important advantage arising from the use of the chloride compounds is that they are non-toxic and that the existence of vapours derived from the coatings at a temperature of 1,000° C. or higher involves no health hazards for the technicians operating the process.

Further the chloride compounds selected for use in manufacturing flat glass as aforesaid have not such an affinity for water that they are hygroscopic and require a preliminary drying out before being used.

Sodium chloride being a reasonably cheap commodity affords economies in the protection of the glass from the presence of contaminants in the bath. Moreover, because of the difference between the specific gravity of either chloride compound and the molten metal, the coating can be readily circulated over the molten metal from time to time in a process of renewing the coating or translating the coating on the bath surface to advance the molten coating along the molten metal to the cooler zone at the discharge end and to remove the solid coating on the bath, thereby renewing and compacting the solid coating under the glass at the discharge end.

Particularly is the maintenance of a protective gas necessary against the possibility of fissures or capillaries appearing in the coating as the ribbon is advanced if the coating depth is such as to overlap the ribbon of glass on the bath, moreover the relative movement between the glass and the coating may cause eddying such as would induce permeation of the coating by the gases in the headspace.

We claim:

1. A method of manufacturing flat glass during which glass in ribbon form, of less width than the bath so as to leave an exposed surface at the sides of the ribbon, is advanced along a bath of molten metal and is subjected to a temperature gradient during its advance towards the cooler end of the bath where it is taken up from the bath surface for discharge from the bath, characterised by covering the exposed bath surface with a protective layer at least in the region of the discharge end of the bath at the sides of the advancing ribbon of glass and beneath the ribbon as it is discharged, lowering the temperature at the discharge end portion of the bath to maintain said layer in a solid state whereby the ribbon is taken up from the bath adjacent to a solid portion of said layer, said layer being of a material which is not reactive to the glass or to the bath and being of a material which is solid at the temperature of the discharge end of the bath and is in molten form higher up the bath, the part of the layer covering the exposed surface of the discharge end of the bath being substantially of sufficient depth to isolate the bath metal from the atmosphere over the bath.

2. A method according to claim 1, wherein the part of the protective layer covering the exposed surface of the discharge end of the bath is about 4 millimeters deep.

3. A method according to claim 1, wherein the protective layer is a layer of sodium chloride.

4. A method according to claim 1, wherein the protective layer is a mixture of sodium chloride and potassium chloride in which the sodium chloride component constitutes at least 50% by weight of the mixture.

5. A method according to claim 1, wherein the protective layer is an equimolecular eutectic mixture of sodium chloride and potassium chloride.

References Cited

UNITED STATES PATENTS 2,754,559   7/1956   Fromson _____ 164—81

DONALL H. SYLVESTER, *Primary Examiner.*

A. D. KELLOGG, *Assistant Examiner.*